2,960,520
PROCESS FOR DECOLORIZING DIBASIC ACID ESTERS WITH PENTANE

George P. Brown, Jr., West Deer Township, Allegheny County, and Harry J. Elder and Norman W. Franke, Tarentum, Penn Township, Allegheny County, Pa., assignors to Gulf Research & Development Company, Pittsburgh, Pa., a corporation of Delaware No Drawing. Filed Aug. 29, 1957, Ser. No. 680,921

4 Claims. (Cl. 260—452)

This invention relates to an improved process for refining dibasic acid esters, and more particularly to a process for refining dibasic acid esters containing nitrogen impurities.

Dibasic acids used in preparing dibasic acid esters can be obtained by oxidizing hydrocarbons, aliphatic, naphthenic or aromatic, or air-oxidized derivatives thereof, with nitric acid. Unfortunately when dibasic acids so produced are used in preparing dibasic acid esters the latter are dark in color and therefore somewhat unattractive commercially. While attempts have been made to decolorize such dibasic acids by conventional processes such as by filtering the same through beds of carbon or fuller's earth, the results have not been very successful and the dibasic acid esters so treated have still been characterized by objectionable color.

We have found that dibasic acid esters prepared from dibasic acids obtained as a result of nitric acid oxidation of hydrocarbons can be decolorized and an acceptable product obtained by a process which comprises extracting such esters with pentane.

The dibasic acid esters which are decolorized in the process of this invention are those which have been prepared using dibasic acids obtained by the nitric acid oxidation of hydrocarbons. In general, such dibasic acids are prepared by oxidizing a hydrocarbon, aliphatic, naphthenic or aromatic, or air-oxidized derivatives thereof, with nitric acid having a concentration of about 10 to about 100 percent, preferably about 50 to about 95 percent, at a temperature of about 50° to about 150° C., preferably about 75° to about 130° C., and a pressure of about atmospheric to about 1500 pounds per square inch, preferably about 100 to about 1000 pounds per square inch, for about 5 minutes to about 60 hours, preferably about 15 minutes to about 2 hours. The product obtained can then be treated, for example by distillation at a temperature of about 30° to about 75° C. and a pressure of about 5 to about 100 millimeters of mercury, to remove nitric acid therefrom and obtain a product predominating in dibasic acids having about 3 to about 12 carbon atoms.

This process is particularly effective in decolorizing dibasic acid esters prepared with dibasic acids obtained in accordance with the process disclosed and claimed in U.S. Patent No. 2,771,482 dated November 20, 1956, to George P. Brown, Jr., Edgar I. Crowley and Norman W. Franke and assigned to the assignee of this invention. Briefly, in the process of the patent a saturated aliphatic hydrocarbon is initially subjected to oxidation with air or other oxygen-containing gas, i.e., a gas containing free oxygen, for a time sufficient to obtain a product having a saponification number above about 100, and preferably between about 150 and 450, and the product obtained is thereafter subjected to further oxidation at an elevated temperature with nitric acid having a concentration above about 50, and preferably above about 60 percent, for a time sufficient to obtain substantial amounts of dibasic acids having 3 to 12 carbon atoms, such as succinic, glutaric, adipic, etc.

Alcohols which are employed in preparing the dibasic acid esters, monoesters as well as diesters, which are to be treated in accordance with the process of this invention are aliphatic monohydric alcohols containing one or two carbon atoms per molecule.

The conditions under which the esterification reaction resulting in the dibasic acid esters which are decolorized in the present process are carried out are conventional and need not be described in great detail. Thus, the esterification is satisfactorily carried out by refluxing the dibasic acid with an excess of the monohydric alcohol, for example, a 3:1 mol ratio of alcohol to acid, preferably in the presence of a small amount of a suitable catalyst, e.g., sulfuric acid, dry hydrogen chloride, p-toluene sulfonic acid, or the like, for a period of about 3 to about 10 hours, for example 5 hours. The time of reaction normally decreases with increased temperature of the reaction mixture. Although esterification can proceed to some degree at temperatures as low as room temperature, elevated temperatures of the order of about 60° to about 240° C. are preferably employed.

Examples of dibasic acid esters which can be decolorized in accordance with the present process are dimethyl succinate, dimethyl glutarate, dimethyl adipate, diethyl succinate, diethyl glutarate, diethyl adipate, etc. The dibasic acid esters which are decolorized in the present process have many uses but are of particular utility as intermediates in the manufacture of plastics, plasticizers and lubricants.

While we are not completely certain of the composition of the impurities present in the dibasic esters treated in accordance with the present process, we believe the same to be composed of nitrogen or nitrogen-containing compounds whose presence is attributed to the nitric acid employed in preparing the dibasic acids used in making the esters. In recovering the dibasic acids from the reaction mixture obtained from the nitric acid oxidation of hydrocarbons, apparently not all of the nitrogen-containing compounds are removed, and thus remain in the dibasic acids. The reason for the above belief resides in the fact that it has been observed that the dibasic acid esters treated in the present process have a lower nitrogen content than the untreated esters.

Initially the dibasic acid ester to be treated is mixed with pentane and the mixture permitted to stand, for example about 5 to about 90 minutes, until two phases are obtained. In the top phase is to be found the pentane with a portion of the ester dissolved therein, which ester has been decolorized, while in the bottom phase is to be found the remainder of the ester along with the color-imparting impurities. The two phases are then separated in any convenient method, for example by decantation. The upper phase after removal is treated in any suitable manner, such as by distillation at atmospheric pressure and initially at a temperature of about 95° to about 100° F., to remove the pentane therefrom, which can be collected and recovered, leaving the decolorized ester. The lower phase can then be treated with additional pentane as before to form two liquid phases, and this can be continued several times, or as many times as necessary, until substantially all of the decolorized ester has been removed in the upper phases. The final lower phase will contain the color-imparting bodies present in the original ester. The amount of pentane used in relation to the ester is high, about 50 to about 5 volumes per volume of ester, preferably about 30 to about 20 volumes per volume of ester.

The temperature and pressure required to effect the purification process of this invention must be such that the pentane and ester remain in the liquid phase during the operation. Thus a temperature of about 0° to about 200° F., preferably about 50° to about 100° F., and a pressure of about one-half to about 5 atmospheres, preferably about one-half to about 2 atmospheres, are satisfactory.

This invention can be further illustrated by the following representative examples.

*Example I*

1723 grams of oxidized wax mixture consisting of 645 grams of oil phase acid recovered from a previous nitric acid stage oxidation of air-oxidized deoiled foots oil and 1078.6 grams of a 234 saponification number air-oxidized deoiled foots oil obtained by blowing 1152 grams of deoiled foots oil for eleven hours at 160° C. with 5.0 liters of air per minute per kilogram of wax were continuously passed to a continuous autoclave together with 5060 grams of 65.6 percent aqueous nitric acid and 4280 liters of air. The pressure was maintained at about 500 pounds per square inch gauge, the temperature at 130° C. and the residence time was 30 minutes. The product obtained comprised a two-phase liquid product consisting of 5564 grams of nitric acid phase and 866 grams of oil phase. The oil phase was washed three times, each time with 400 grams of distilled water at about 90° C. The washings settled and were decanted, after cooling, after each wash, giving three oil phase washings. The washed oil phase was then heated for several hours in an open beaker over a water bath to evaporate dissolved water yielding 684 grams of oil phase acids.

The nitric acid phase was placed in a distillation flask and nitric acid distilled off at a pot temperature of 35° to 45° C., the temperature being regulated by the degree of vacuum maintained on the system, the pressure being adjusted to about 30 mm. Hg. Near the end of the distillation as the pot temperature began to increase, the pressure was gradually lowered to about 5 mm. Hg and the temperature was permitted to increase to 50° C. at which point the distillation was stopped. The first oil phase wash was added to the residue in the still pot and distillation was resumed under conditions similar to the main distillation. Distillation was again stopped at a pot temperature of 50° C. at 5 mm. Hg. Similarly the second and third oil phase washes were added and distilled off. The final residue of crude dibasic acids remaining in the pot and weighing 990 grams was transferred to a beaker and slowly heated, while stirring, to 130° C. to decompose any nitric acid remaining.

500 grams of the dibasic acids thus obtained were placed in a flask equipped with a reflux condenser along with 540 grams of methyl alcohol (2.5 equivalents of alcohol per equivalent of acid) and 10.4 grams of 96 percent sulfuric acid catalyst and the mixture was refluxed for one hour. The reflux condenser was then replaced by a side arm take-off condenser and during the following hour 274 ml. of methyl alcohol and water of reaction were distilled off. Distillation was then continued for an additional five hours during which time 750 ml. of methyl alcohol was continuously added to the flask at a fairly constant rate while 710 ml. of distillate were being collected in the receiver. In three 250 ml. portions 750 ml. of benzene were added to the flask and distilled off to azeotrope out water present and to remove the excess methyl alcohol, 990 ml. of distillate being obtained. The ester residue remaining in the flask was then titrated to determine its acidity due to catalyst present and unesterified acid and was then neutralized with 50 percent excess solid sodium bicarbonate and filtered. The neutralized ester was then vacuum distilled through a one-inch diameter column packed for 3 inches of its length with small glass helices at about 6 mm. Hg yielding 473.6 grams of distilled methyl ester.

70 milliliters of the ester, which had a dark amber color, were placed in a 250 milliliter graduate, and n-pentane was added thereto to fill the graduate to 250 milliliters. The two liquids were mixed and the two phases present were permitted to settle for 30 minutes until no ester droplets were visible in the pentane phase. The lower phase (that is, the ester phase) amounted to 54 milliliters. Part of the upper pentane phase was then decanted to leave 14 milliliters of the pentane phase remaining in the graduate and 182 milliliters of pentane was again added to the remaining ester to fill the graduate and the process repeated. The results are set forth below in Table I.

TABLE I

| Extraction | Volume of Ester Phase, ml. | Volume of Undecanted Pentane Phase, ml. | Volume in ml. of Pentane Added to Make 250 ml. |
|---|---|---|---|
| 1 | 70 | 0 | 180 |
| 2 | 54 | 14 | 182 |
| 3 | 28 | 38 | 184 |
| 4 | 18 | 47 | 185 |
| 5 | 13 | 51 | 186 |
| 6 | 10 | 55 | 185 |
| 7 | 8.5 | 3.5 | 238 |

It is apparent that the total volume of pentane used in the extraction amounted to 1340 milliliters. After decanting completely the pentane from the seventh extraction, only 7.0 milliliters of ester having a very dark amber color remained. The color-imparting bodies present in the original ester were found in the residual ester, for the 63 grams of ester recovered in the pentane phases had a pale lemon color.

Similar results are obtained in Example II below.

*Example II*

35.3 grams of the same ester treated in Example I were placed in a separatory funnel along with 60 milliliters of n-pentane. The mixture was shaken and permitted to stand for 15 minutes until the two phases had separated. The lower ester phase was then removed from the separatory funnel and again treated with 60 milliliters of pentane as before. This process was repeated nine additional times on the lower ester phases in the funnel. The combined pentane phases upon evaporation on a hot plate gave a yield of 26.12 grams of a straw-colored ester. The raffinate fraction, containing the color-imparting bodies present in the original ester, amounted to 4.09 grams of a very dark brown ester.

While we have shown the decolorization process above as being effected in several extractions, it is obvious that this is for purpose of illustration only and there is no intention to be limited thereby. The number of extractions can be from one, for example, to the eleven shown in Example II, depending on the many variables involved such as the solubility of the ester in the pentane, the amount and kind of nitrogen-containing impurity, the degree of purity desired in the final ester, etc.

Obviously many modifications and variations of the invention, as hereinbefore set forth, can be made without departing from the spirit or scope thereof, and therefore only such limitations should be imposed as are indicated in the appended claims.

We claim:

1. A process for decolorizing dibasic acid esters containing color-imparting bodies prepared from dibasic acids having 3 to 12 carbon atoms obtained as a result of the nitric acid oxidation of hydrocarbons and aliphatic monohydric alcohols which comprises extracting such esters with about 5 to about 50 volumes of pentane per volume of ester under pressure and temperature conditions such as to maintain the pentane and such ester in liquid phase.

2. A process for decolorizing diabasic acid esters containing color-imparting bodies prepared from dibasic acids having 3 to 12 carbon atoms obtained as a result of the nitric acid oxidation of hydrocarbons and aliphatic monohydric alcohols having one to two carbon atoms which comprises extracting such esters with about 5 to about 50 volumes of pentane per volume of ester under pressure and temperature conditions such as to maintain the pentane and such ester in liquid phase.

3. A process for decolorizing dibasic acid esters containing color-imparting bodies prepared from dibasic acids having 3 to 12 carbon atoms obtained as a result of the nitric acid oxidation of hydrocarbons which comprises adding pentane under pressure and temperature conditions such as to maintain the pentane and such esters in liquid phase to said esters to obtain an upper phase comprising pentane and decolorized esters and a lower phase comprising esters containing color-imparting bodies, and thereafter recovering decolorized esters from said upper phase, the amount of pentane employed relative to said dibasic acid esters being treated being about 5 to about 50 volumes of pentane per volume of ester.

4. A process for decolorizing dibasic acid esters containing color-imparting bodies prepared from dibasic acids having 3 to 12 carbon atoms obtained as a result of the nitric acid oxidation of hydrocarbons and aliphatic monohydric alcohols having one to two carbon atoms which comprises adding pentane under pressure and temperature conditions such as to maintain the pentane and such esters in liquid phase to said esters to obtain an upper phase comprising pentane and decolorized esters and a lower phase comprising esters containing color-imparting bodies, and thereafter recovering decolorized esters from said upper phase, the amount of pentane employed relative to said dibasic acid esters being treated being about 5 to about 50 volumes of pentane per volume of ester.

References Cited in the file of this patent

UNITED STATES PATENTS

| | | |
|---|---|---|
| 2,771,482 | Brown et al. | Nov. 20, 1956 |
| 2,783,270 | Polly et al. | Feb. 26, 1957 |
| 2,824,122 | Kuceski | Feb. 18, 1958 |
| 2,824,134 | Hill et al. | Feb. 18, 1958 |